United States Patent [19]

Lindén

[11] Patent Number: 4,919,180
[45] Date of Patent: Apr. 24, 1990

[54] FIXED OR SLEEVE-MOUNTED SPIKE, FITTED ON A VEHICLE TIRE

[75] Inventor: Unto Lindén, Hämeenlinna, Finland
[73] Assignee: Neste Oy, Finland
[21] Appl. No.: 223,236
[22] PCT Filed: Nov. 17, 1987
[86] PCT No.: PCT/FI87/00154
   § 371 Date: Aug. 24, 1988
   § 102(e) Date: Aug. 24, 1988
[87] PCT Pub. No.: WO88/03876
   PCT Pub. Date: Jun. 2, 1988

[30] Foreign Application Priority Data

Nov. 26, 1986 [FI] Finland .................................. 864820

[51] Int. Cl.$^5$ ............................................ B60C 11/14
[52] U.S. Cl. .................................................. 152/210
[58] Field of Search ............... 152/167, 168, 169, 208, 152/209, 210, 211, 212

[56] References Cited

U.S. PATENT DOCUMENTS 3,404,718 10/1968 Smith ................................. 152/210
3,426,822 2/1969 Trendowski ........................ 152/210
3,477,490 11/1969 Carlstedt ............................ 152/210
3,693,688 9/1972 Schuman ........................... 152/210

FOREIGN PATENT DOCUMENTS 59-202912 11/1984 Japan .................................. 152/210
112350 2/1968 Norway .
204876 5/1966 Sweden .
227364 10/1969 Sweden .

Primary Examiner—Raymond Hoch
Attorney, Agent, or Firm—Steinberg & Raskin

[57] ABSTRACT

The invention concerns a fixed spike or a sleeve-mounted spike, fitted on a vehicle tire. The fixed spike or sleeve-mounted spike (20) has been so shaped that when the spike is in its state at rest, its region (A) in contact with rubber (14) is substantially smaller than the total surface area of the respective region of the spike. Flow, caused by the visco-elastic properties of the rubber (14), of the rubber (14) around the fixed spike or the sleeve-mounted spike (20), is arranged to soften the first contact between the tip (23) of the fixed spike or rivet (21) of the sleeve-mounted spike (20) and the road surface.

8 Claims, 4 Drawing Sheets

FIXED OR SLEEVE-MOUNTED SPIKE, FITTED ON A VEHICLE TIRE

BACKGROUND OF THE INVENTION

The present invention concerns a fixed spike or a sleeve-mounted spike, fitted on a vehicle tire.

Increasing traffic load and spike tires in combination have proved to be a remarkable road attrition factor. In some countries this has even led to prohibition of spike tires, or at least to considerable restrictions.

In Nordic countries, the beneficial effect of anti-slip means on the safety and flexibility of traffic has on the other hand been irrefutably demonstrated, and this effect should not be sacrificed: instead, the drawbacks should merely be eliminated. Good results will be achieved by further developing both the road superstructures and the anti-slip tires.

As a pneumatic tire rolls on an even surface, it is considerably flattened radially, owing to its flexibility, whereby in the contact region longitudinal as well as transverse forces are generated owing to changes of the rolling radius.

When the tire rolls and the spike meets the road surface, a very rapid impact against the road is produced owing to the kinetic energy of the rubber and the visco-elastic nature of the rubber entailing resistance to fast movements.

When a spike approaches the point of contact with the road, the tire body undergoes bending such that the radius of the bent part is significantly smaller than that of equivalent parts of the load-free tire. This deflects the spike, which has been mounted at right angles against the surface, to assume a vertical position before contact with the road. Owing to the protrusion of the spike tip, however, the spike is not turned into sufficiently upright position; it meets the road surface in an oblique position. At this stage, the forces due to slippage tendency also begin to exert their influence.

When the rotating tire and the piece projecting therefrom (the spike) met the road surface, an impact effect acting on the road is produced by the kinetic energy and the rapid deformation of the rubber. Road attrition can be significantly reduced if this impact effect can be eliminated or reduced. With the aid of the present invention the impact due to the visco-elasticity of the rubber is reduced.

The phenomenon counteracting the rapid impact-type deformations of the rubber can be represented with a model consisting of an elastic spring and a viscous liquid cylinder or of combinations of these. The principle is that the viscous component becomes predominant in the case of rapid deformations, which is just the type that is concerned at the initial moment of the tire's road contact. The visco-elastic impact is described by a mathematical model worked out by Floor:

$$\Sigma = \frac{\sigma}{E} (1 - e^{-t/\lambda})$$

where
$\Sigma$ = Deformation
$\sigma$ = Stress
$E$ = Modulus of elasticity
$t$ = Time
$\lambda$ = Retardation time It is apparent from the form of the mathematical model that when t, or the deformation time, is very short or becomes shorter, the deformation required for producing a given stress state decreases exponentially. This is due to the fact that when the viscous component of the rubber is predominant it has not time to participate in rapid movements in the manner implied by its elasticity, the consequence being a rapid and strong impact effect.

Spike designs known heretofore have not eliminated this visco-elastic impact, nor the road attrition effect resulting therefrom. Traditionally, the spike has obtained support from the rubber on the whole region of the flange part and by mediation of the respective surfaces of the body part, whereby the impact acting on the rubber has been powerful, causing road attrition and damage to the tire rubber.

Traditionally, the flow of rubber has not been taken into account when designing anti-slip means, as a result of which the body installed in the rubber will damage the rubber material, causing loosening of the spike and, directly or indirectly, damage to the body structure of the tire. Most usually such damage has been due to the circumstance that the shapes of the spike include sharp edges or detrimental discontinuities which cause wear of the rubber bonds as the rubber material flows past them and is urged against the sharp edges, due to the state of stress. Such discontinuities are also detrimental at which closed air pockets are formed. When the spike is pushed into the tire and rubber flows into such air pockets the pressure of the rubber is significantly higher than the air pressure and therefore the air is compressed in rapid impact; it is powerfully heated and causes damage to the surrounding rubber.

SUMMARY OF THE INVENTION

The object of the invention is to achieve an improvement of fixed spike designs, respectively of sleeve-mounted spike designs, known at present. The more detailed aim of the invention is to provide a fixed spike, respectively a sleeve-mounted spike, in which the drawbacks encountered in presently known designs are avoided.

The aims of the invention are attained with a fixed spike or a sleeve-mounted spike, characterized in that the fixed spike or the sleeve-mounted spike, has been shaped so that when the spike is in its state at rest, its region in contact with rubber is substantially smaller than the total area of the respective regions of the spike, the rubber flow, resulting from the visco-elastic properties of the rubber, around the fixed spike or the sleeve-mounted spike, being arranged to soften the first contact between the tip of the fixed spike or of the sleeve-mounted spike, and the road surface.

In an advantageous embodiment of the invention, the fixed spike or the sleeve-mounted spike, has been shaped so that when the spike is in its state at rest, the contact area with the rubber, projected perpendicularly from the regions producing the impingement force of the spike on the plane of the road surface, is substantially less than the total area of the respective region of th rubber, the rubber flow, resulting from the visco-elastic properties of the rubber, around the fixed spike or the sleeve-mounted spike, being arranged to soften the first contact between the tip of the fixed spike or of the sleeve-mounted spike, and the road surface.

In an advantageous embodiment of the invention, the flanges of the fixed spike or of the sleeve-mounted spike, is provided with one or more eminences.

In another advantageous embodiment of the invention, the flange of the fixed spike or of the sleeve-mounted spike, is provided with depressions, advantageously groove-like depressions.

In a third advantageous embodiment of the invention, the contact region between the flange and the rubber of the fixed spike or of the sleeve-mounted spike, is substantially annular.

In an advantageous embodiment of the invention, the flow of rubber into the depressions in the fixed spike in the sleeve-mounted spike, is at the same time arranged to produce a force rotating the spike.

In another advantageous embodiment of the invention, the tip of the rivet of the sleeve-mounted spike is disposed asymmetrically with reference to the axial direction of the spike, this having been arranged to produce a force rotating the spike.

In all advantageous embodiments of the invention, additionally, the shaped parts of the fixed spike or of the sleeve-mounted spike, have been disposed at the same time to form a ventilation passage or passages which enable air flow past the spike.

As taught by the invention, the spike is so constructed that it obtains support from the rubber at the initial phase of road contact on a small contact area only, whereby the visco-elastic impact of the rubber is substantially damped. At the same time, the cleaning and cooling effect of the air flow is utilized.

As the tire rolls on from the initial point of road contact, the wear surface consisting of rubber is impacted between the cord structure of the tire and the road surface, whereat the rubber is not compressed, but being an elastic material flows into the air depressions of the spike, displacing air that is present therein. In this way an adequate penetration force for entering the ice surface under the tip is obtained, and a pressure effect supporting the body of the spike.

BRIEF DESCRIPTION OF THE DRAWINGS

The invention is described in the following in detail with reference being made to certain advantageous embodiments, presented in the figures of the attached drawing, yet to which the invention is not meant to be exclusively confined. In the drawings.

DESCRIPTION OF THE PREFERRED EMBODIMENTS

Figure 1:
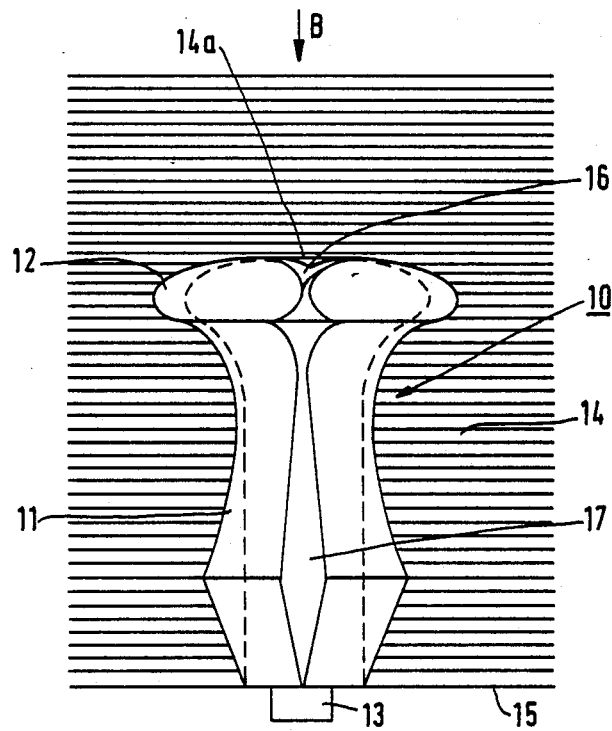
FIG. 1 presents the principle embodiment of the fixed spike of the invention.
Figure 2A:
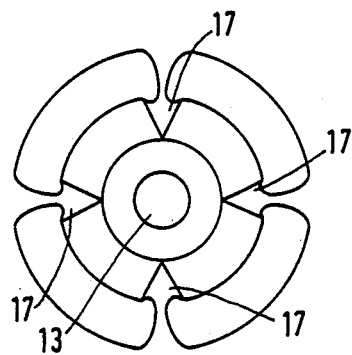
FIG. 2a presents the fixed spike of FIG. 1, viewed from below.
Figure 2B:
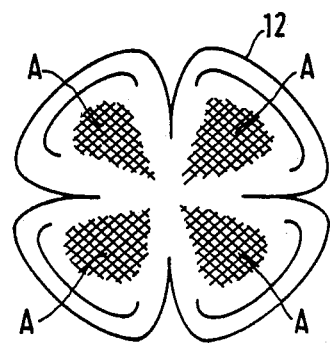
FIG. 2b presents the fixed spike of FIG. 1, viewed in the direction B.

In FIGS. 1, 2a and 2b, the fixed spike of the invention in general has been indicated with reference numeral 10. The fixed spike 10 consists of a body part 11, a flange part 12 and a tip 13. The rubber of the vehicle tire is indicated with reference numeral 14, and the wear surface of the tire with reference numeral 15. The region of contact between the fixed spike 10 and the rubber 14 is indicated with A. As can be clearly seen in FIGS. 1 and 2b, the contact region A of the fixed spike, in this instance the contact region A of the flange part 12, is such that air pockets 16 remain between the rubber 14 and the surface 14a. Similarly, the contact region of the body part 11 is such that air passages 17 are formed between the body part 11 and the surface 14a of the rubber 14, by the aid of which the air pockets 16 are ventilated.

According to the basic idea of the invention, the fixed spike 10 has been shaped so that when the spike is in its state at rest, its contact region A with the rubber is substantially smaller than the total area of the respective region of the spike, the flow of the rubber 14, caused by the visco-elastic properties of the rubber 14, around the fixed spike 10 having been arranged to soften the first contact between the tip 13 of the fixed spike 10 and the road surface.

The shaped parts of the fixed spike 10 have been disposed at the same time to form ventilation passage, or passages, 16, which enable air flow past the spike.

Figure 3:
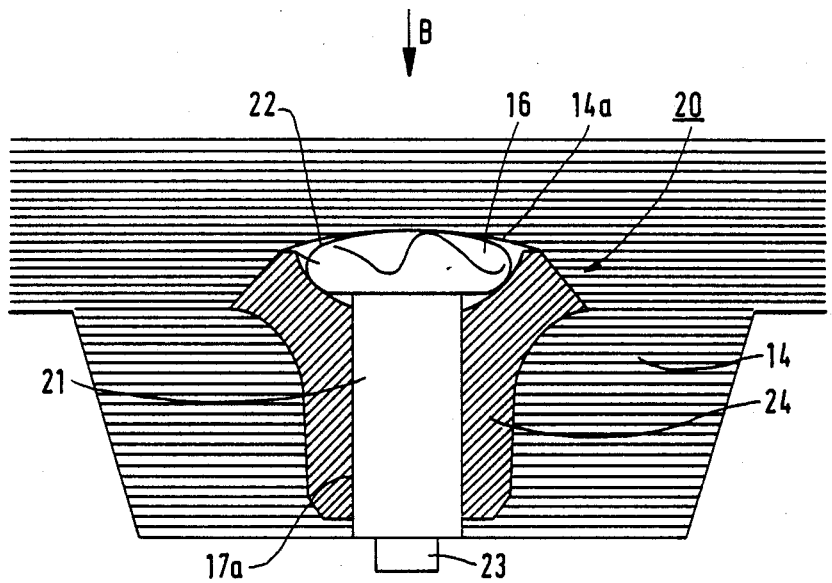
FIG. 3 presents the principle embodiment of the sleeve-mounted spike of the invention.
Figure 4:
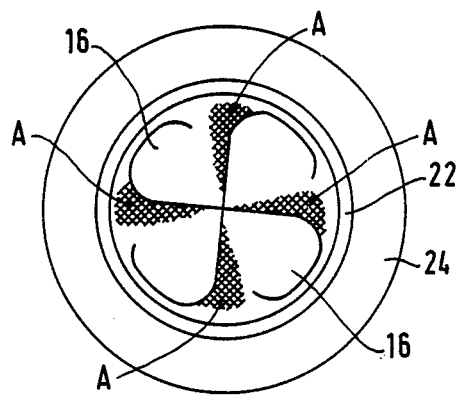
FIG. 4 presents the sleeve-mounted spike of FIG. 3, viewed in the direction B.

In the embodiment of FIGS. 3 and 4, the sleeve-mounted spike in general has been indicated with reference numeral 20. The sleeve-mounted spike 20 consists of a rivet 21, a flange 22 of the rivet 21, a tip 23 and a sleeve 24. In FIGS. 3 and 4, the contact region has likewise been indicated with A, as in the embodiment of FIGS. 1 and 2. The air flow out from the air pocket 16 is through the clearance 17a between the rivet 21 and the sleeve 24. Ventilation may equally be provided in a way similar to that in FIGS. 1, 2a and 2b, that is, by providing in the rivet 21 or in the sleeve 24 a ventilation passage or passages 17.

Figure 5:
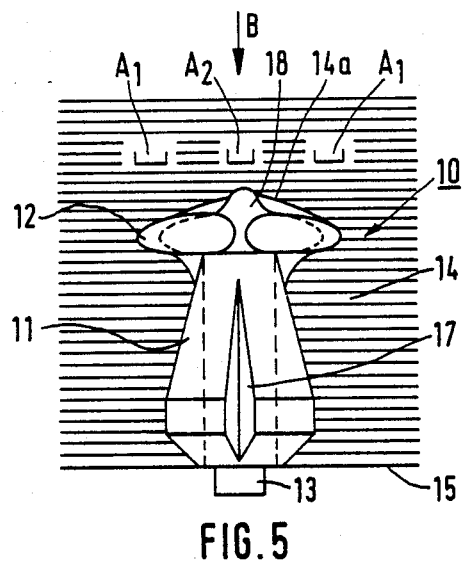
FIG. 5 presents an advantageous embodiment of the fixed spike of the invention.
Figure 6:
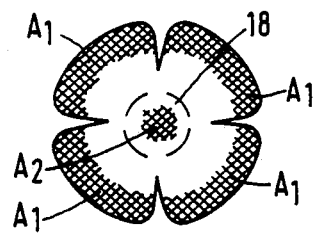
FIG. 6 presents the fixed spike of FIG. 5, viewed in the direction B.

The basic idea of the invention has been implemented in the embodiment of FIGS. 5 and 6 in that on the flange part 12 of the fixed spike 10 has been provided one or more eminences 18. Hereby, the flange part 12 touches the rubber 14 on the marginal area $A_1$ and on the area $A_2$ of the eminence 18. Thus, in this embodiment the contact region A is made up of the sum of the contact area $A_1$ and $A_2$.

Figure 7:
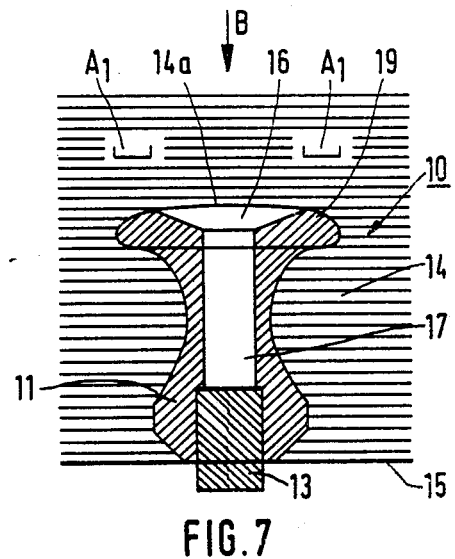
FIG. 7 presents another advantageous embodiment of the fixed spike of the invention.
Figure 8:
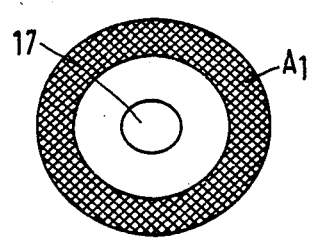
FIG. 8 presents the fixed spike of FIG. 7, viewed in the direction B.

In the embodiment of FIGS. 7 and 8, on the flange part of the fixed spike 12 an annular eminence 19 has been provided. Thus, in this embodiment the contact region A consists of the annular eminence area $A_1$. In this embodiment, the ventilation passage 17 consists of a wide hole made in the body part 11. The tip 13, or the body 11, may consist of porous material, in which case no separate hole need be provided in the body part 11 or in the tip 13 in order to accomplish ventilation.

Figure 9:
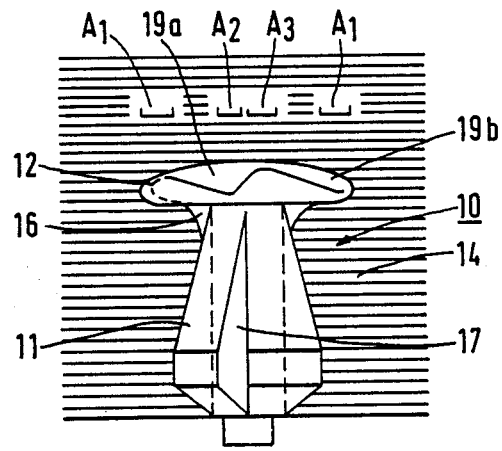
FIG. 9 presents a third advantageous embodiment of the fixed spike of the invention.

In the embodiment of FIG. 9, one or several depressions have been formed in the flange part of the fixed spike, advantageously groove-like depressions $19a, 19b$, etc. In this embodiment, the contact region consists of the sum of the contact areas $A_1$, $A_2$ and $A_3$. In the embodiment of FIG. 9 the fixed spike is such that owing to the sharp angle an air pocket 16 is formed under the flange part 12, and which is ventilated, as taught by the invention, with the aid of a ventilation passage, or passages, 17.

Figure 10:
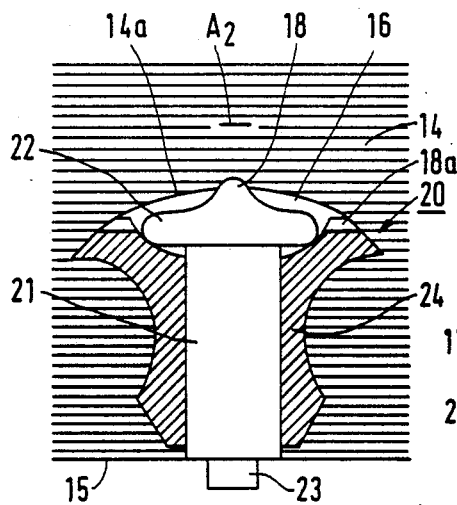
FIG. 10 presents an advantageous embodiment of the sleeve-mounted spike of the invention.

In the embodiment of FIG. 10, in the flange 22 of the sleeve-mounted spike 20 has been provided, in like manner as in the embodiment of FIGS. 5 and 6, one or several eminences 18. In this embodiment, the contact region A consists of the contact area $A_2$ at the eminence.

Figure 11:
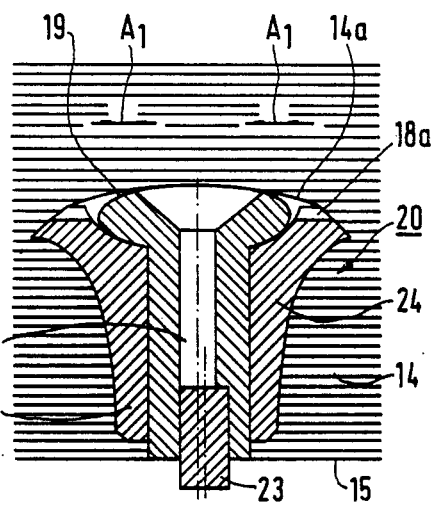
FIG. 11 presents another advantageous embodiment of the sleeve-mounted spike of the invention.

In the sleeve-mounted spike 20 of FIG. 11, a similar inventive idea has been applied as in the embodiment of FIGS. 7 and 8. In this embodiment, on the flange 22 of the rivet 21 of the sleeve-mounted spike 20 an annular eminence 19 has been formed, whereby the contact region A consists of the annular eminence area $A_1$.

Figure 12:
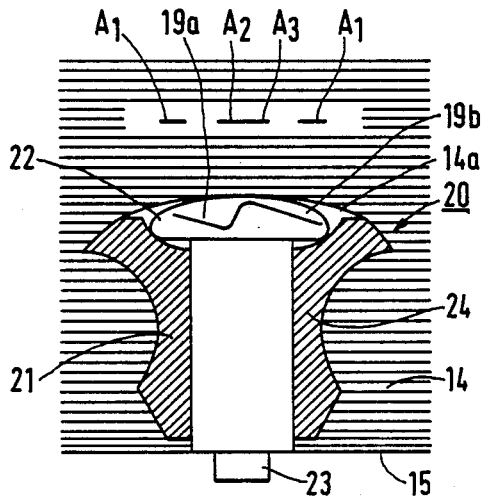
FIG. 12 presents a third advantageous embodiment of the sleeve-mounted spike of the invention.

The sleeve-mounted spike 20 of FIG. 12 has been devised in similar manner as the fixed spike 10 of the FIG. 9. In this embodiment, in the flange 22 of the rivet 21 of the sleeve-mounted spike 20 has been formed one or several depressions, advantageously groove-like depressions 19a,19b, etc. In this embodiment, the contact region A consists of the sum of the contact areas $A_1, A_2$ and $A_3$.

When a fixed spike as shown in FIGS. 1, 2 and 5–9 or a sleeve-mounted spike as shown in FIGS. 3, 4 and 10–12, is installed in a hole in the tire, at appropriate height, the spike is supported against the rubber 14 in free state by the outer margin of the flange 12 or 22, and in addition by the point(s) of the knob or knobs, by the annular contact surface or by the ridges of the grooving, between which at all events remains an ample air space as well as free surface 14a of the rubber 14. When the fixed spike 19 or the sleeve-mounted spike 20 enters road contact, into the rapid impact over the spike against the road surface, caused by the visco-elasticity of the rubber 14, will be small because the contact region A of the spike with the rubber 14 is small. As the tire rolls on, the rubber, as it is compressed, will fill the air pockets 16 of the flange part 12 or 22, and with the aid of the vehicle's weight produces a sufficient punching force to ensure the holding capacity of the spike.

The flow of the rubber 14 into the depressions in the fixed spike 10 or in the sleeve-mounted spike 20, has at the same time been arranged to produce a force rotating the spike. When the spike rotates, the edges of the tip 13 or 23, remain sharp, whereby its penetration into the ice surface in a situation of slipping is achieved with lesser punching force. The holding properties of the spike 10,20 are then superior to those of a tip which has been worn round. Thus with depressions of this kind, at the same time a significant additional effect is obtained which tends to enhance the technical effect achieved with the spike of the invention.

In the case of a sleeve-mounted spike it is possible to produce a force rotating the spike in that the tip 23 of the rivet 21 of the sleeve-mounted spike 20 is asymmetrically disposed in relation to the axial direction of the spike, this being arranged to produce a force rotating the spike. Such an asymmetrical disposition of the tip 23 is shown in the embodiment of FIG. 11. The asymmetrical disposition may equally be such that the tip 23 is obliquely positioned with reference to the axial direction of the spike.

According to the basic idea of the invention, the visco-elastic impact is generated in the case of a sleeve-mounted spike 20, mainly, in the region of the flange 22 of the rivet 21. However, shaping similar to that of the flange 22 may also be applied in the case of the parts of the sleeve 24 which lie against the rubber 14, in order that the impact from the sleeve 24 might be reduced and the movement of the sleeve 24 in the rubber 14 might be facilitated. This kind of shaping is indicated with reference numeral 18a in FIGS. 10 and 11.

In the foregoing only a few advantageous embodiments of the invention have been presented, and it is clear to a person skilled in the art that numerous modifications thereof are feasible within the scope of the inventive idea presented above.

I claim:

1. A fixed spike fitted in a vehicle tire and being shaped such that when the spike is in a state at rest, a region thereof in contact with rubber of the tire is substantially smaller than total outer surface area of the spike, wherein the spike comprises a flange having at least one eminence forming said contact region, whereby flow of the rubber around the fixed spike caused by viscoelastic properties of the rubber softens first contact between a tip of the fixed spike with a road surface, wherein said flange additionally comprises at least one depression, whereby flow of the rubber into said at least one depression produces a force rotating the spike.

2. The spike of claim 1, additionally comprising several depressions which are groove-like.

3. The spike of claim 1, additionally comprising several eminences formed by ridges of said grooves.

4. The spike of claim 1, wherein, in said rest state, said flange is supported by the rubber only in the area of said eminence and in a marginal area of said flange.

5. A sleeve-mounted spike fitted on a vehicle tire and being shaped such that when the spike is in a state at rest, a region thereof in contact with rubber of the tire is substantially smaller than total outer surface area of the spike, wherein the spike comprises a flange having at least on eminence forming said contact region, whereby flow of the rubber around the sleeve-mounted spike caused by viscoelastic properties of the rubber, softens first contact between a tip of a rivet of the sleeve-mounted spike with a road surface, wherein said flange additionally comprises at least one depression, whereby flow of the rubber into said at least one depression produces a force rotating the spike.

6. The spike of claim 5, additionally comprising several depressions which are groove-like.

7. The spike of claim 6, additionally comprising several eminences formed by ridges of said grooves.

8. A sleeve-mounted spike fitted on a vehicle tire and being shaped such that when the spike is in a state at rest, a region thereof in contact with rubber of the tire is substantially smaller than total outer surface area of the spike, wherein the spike comprises a flange having at least one eminence forming said contact region, whereby flow of the rubber around the sleeve-mounted spike caused by viscoelastic properties of the rubber, softens first contact between a tip of a rivet of the sleeve-mounted spike with a road surface, and wherein said tip of said rivet of said spike is asymmetrically disposed in a relation to axial direction of the spike, which produces a force rotating the spike.

* * * * *